DEVICE FOR DISPENSING AND APPLYING PRESSURE SENSITIVE TAPE
Original Filed April 25, 1966 7 Sheets-Sheet 1
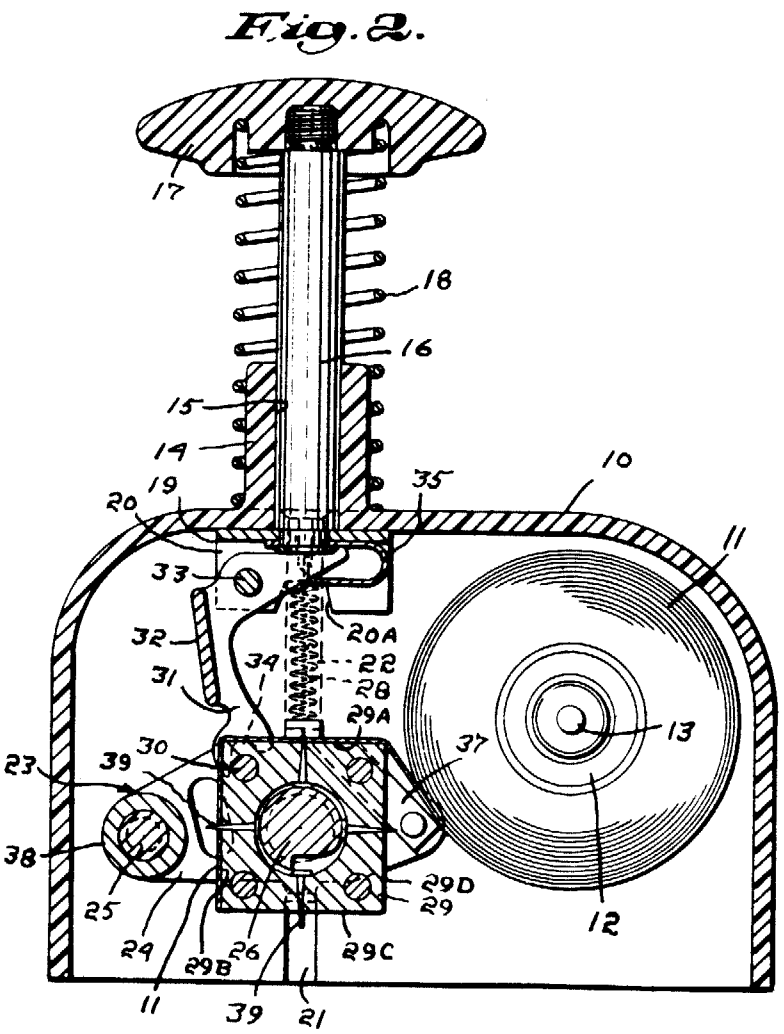
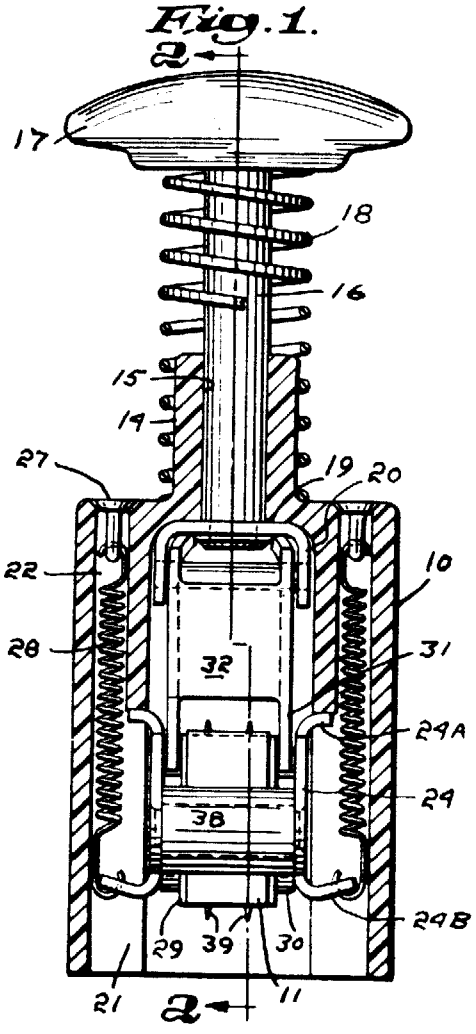

DEVICE FOR DISPENSING AND APPLYING PRESSURE SENSITIVE TAPE

Original Filed April 25, 1966 7 Sheets-Sheet 2

DEVICE FOR DISPENSING AND APPLYING PRESSURE SENSITIVE TAPE

Original Filed April 25, 1966 7 Sheets-Sheet 3

DEVICE FOR DISPENSING AND APPLYING PRESSURE SENSITIVE TAPE

Original Filed April 25, 1966 7 Sheets-Sheet 1

DEVICE FOR DISPENSING AND APPLYING PRESSURE SENSITIVE TAPE

Original Filed April 25, 1960 7 Sheets-Sheet 5

DEVICE FOR DISPENSING AND APPLYING PRESSURE SENSITIVE TAPE

Original Filed April 25, 1966 7 Sheets-Sheet 6

DEVICE FOR DISPENSING AND APPLYING PRESSURE SENSITIVE TAPE

Original Filed April 25, 1966 7 Sheets-Sheet 7

United States Patent Office

Re. 28,010
Reissued May 14, 1974

28,010
DEVICE FOR DISPENSING AND APPLYING PRESSURE SENSITIVE TAPE

David G. Way, Littlefield Road,
Boxborough, Mass. 01720

Original No. 3,455,769, dated July 15, 1969, Ser. No. 552,662, Apr. 25, 1966, which is a continuation-in-part of application Ser. No. 500,746, Oct. 22, 1965. Application for reissue July 14, 1971, Ser. No. 162,613
Int. Cl. B65c *1/02*
U.S. Cl. 156—530 33 Claims

Matter enclosed in heavy brackets [ ] appears in the original patent but forms no part of this reissue specification; matter printed in italics indicates the additions made by reissue.

ABSTRACT OF THE DISCLOSURE

*Dispensers are disclosed for applying sections of pressure sensitive adhesive tapes to a surface. Each dispenser has a feed block about which the tape from a rotatably supported roll is trained and which has a plurality of angularly disposed faces with the corners providing transverse cutting edges. Each block is rotatably supported by a frame reciprocable between an operative position and a surface engaging position and, as an incident of the movement of the frame into the later position, the block is turned to place a trailing face in a position for engagement with the surface. The frame also has an anvil disposed to coact with the trailing corner of a face to sever the tape on a leading face to provide a tape section. The feed block has means operable to detachably anchor the tape to each face on engagement of the tape therewith and movable into an inoperative position on engagement with the surface. The dispenser also includes means operable as a drag on the roll.*

Figure 4:
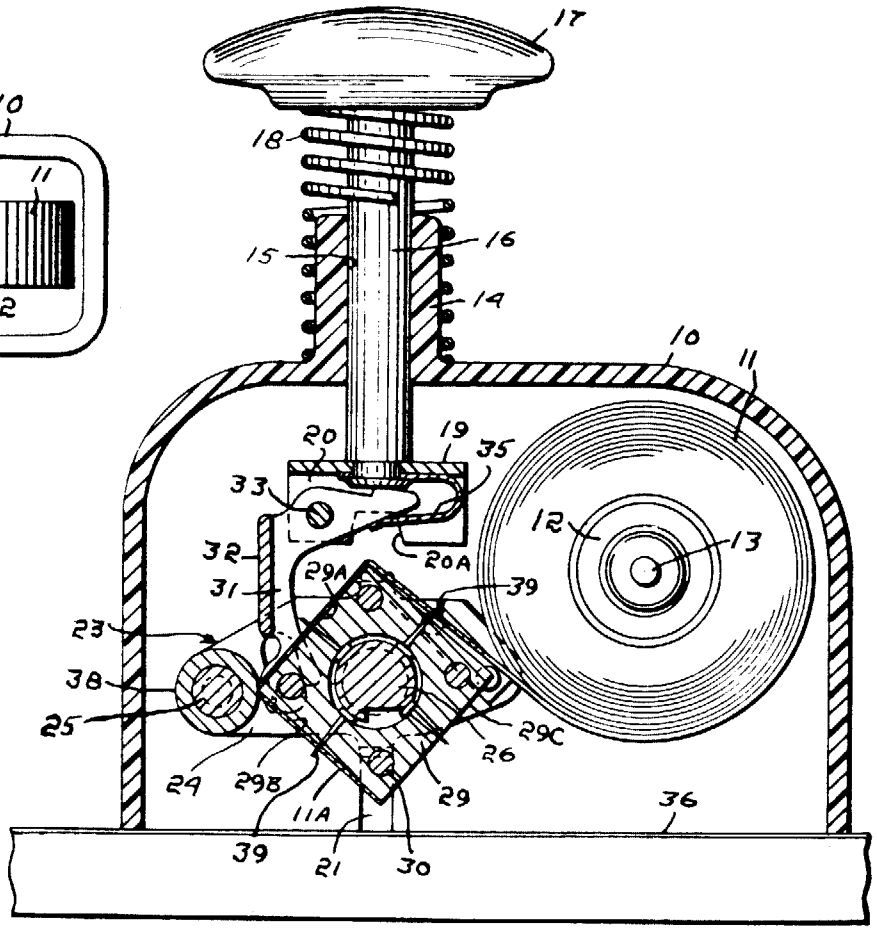

This invention relates to a novel device for dispensing and applying equal lengths of pressure sensitive tape to surfaces for a wide range of uses of which a few examples are securing drawings to drafting boards, marking surfaces, attaching notices to bulletin boards, patching, splicing tapes and films, applying freezer tape to wrapped food packages, sealing wrapped packages, and labeling items. The present application is a continuation-in-part of my co-pending application Ser. No. 500,746, filed Oct. 22, 1965, now abandoned.

Dispensers of pressure sensitive tape now in use are generally stationary, lever actuated devices which meter out predetermined lengths of tape from a roll and either position the metered length for manual grasping and tearing off against a knife, or cut the metered tape to length. A second operation is always necessary, either to remove the tape manually from the dispenser and apply it manually, or in the case where the point of application is to be made on a movable article, to pass the article under the dispenser for the application thereto of a severed length of tape.

As anyone who is familiar with pressure sensitive tape knows, there is a distinct difference between this type of tape and unmoistened gummed tape. Unmoistened gum tape can be removed from a roll, advanced by means of feed rolls, and cut off by conventional shearing blades. In contrast, pressure sensitive tape not only lacks the stiffness of gummed tape, but is so tacky on the sticky side that it immediately sticks to any dry surface with which it comes in contact, including such modern plastics, for example, as polyethylene, nylon, and Teflon. Once the tape has adhered to a surface, the only way to break the contact is to pull the surface and the tape apart, an operation which generally involves the adhesion of the tape to some other surface.

This problem is minimized in most pressure sensitive tape dispensers by allowing the sticky side of the tape of adhere to a feed drum, from which the tape is manually removed.

In the case of a combination dispenser and applier, however, the problem is not so simply solved. The conventional way of removing tape from a roll, the use of a pair of feed rolls, is impossible because the tape adheres to the feed roll contacting the sticky side and rolls up on it. Another difficulty is experienced in cutting the desired length from the web, where use of a pair of shearing blades results in the sticky side of the tape adhering to the adjacent blade.

The general objective of the invention is to avoid such tape-dispensing difficulties as have been referred to by providing a tape-applying device having no surface presented to the sticky side of the tape to which it will adhere. In accordance with the invention, this objective is attained by providing a device for applying to a surface sections of an adhesive-coated tape, the tape being of a pressure sensitive, heat sensitive, or heat-pressure sensitive type, the device having a rotatable, axially supported feed member that has angularly disposed faces with each corner being a linear, transverse, cutting edge. The device has means operable to so turn the feed member as to bring the faces successively into position for engagement with the surfaces. The tape is disposed, coated side outwardly, part way about the feed member and the feed member includes means detachably anchoring the tape to each face and releasable on engagement of that face with the surface. The device is also provided with means coacting with the trailing corners of the tape-covered faces when each is in a predetermined position to so sever the tape as to provide a section that is transferred to the surface on engagement therewith.

Another general objective of the invention is to provide the coacting, tape-cutting means in the form of an anvil transversely of the path of the corners of the feed member and free to turn while the tape on such a corner is in contact with it.

Another general objective of the invention is to provide a device in which the rotary anvil and the rotatable feed member are mounted in a frame movable along a path towards and away from the surface, the movement of the frame along that path desirably being effected by the member-turning means when the feed member has been indexed or stepped to present a section-carrying face in its surface-engaging position.

Yet another general objective of the invention is to provide a device in which means are incorporated to ensure the proper feed of the tape to the feed member from a rotatable roll. One important objective in this direction is to provide a resiliently yieldable tape support that yields when the feed member turns. Another important objective is to provide such a support in a device of the type having the feed member and an anvil carried by a reciprocable frame with the tape being pulled from its roll on movement of the frame and the tape on the feed member being protected against the effects of such a pull. Yet another important objective in tape feed control is the provision of means preventing slack in the tape as it is unwound.

In the accompanying drawings, there are shown illustrative embodiments of the invention from which these and other of its objectives, novel features, and advantages will be apparent.

Figure 3:
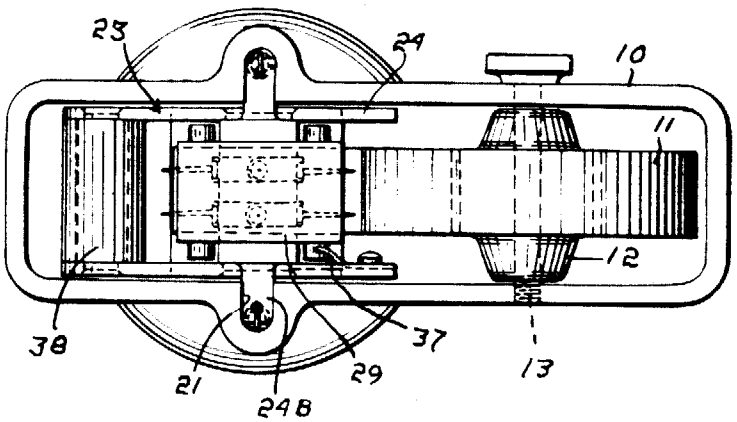
Figure 5:
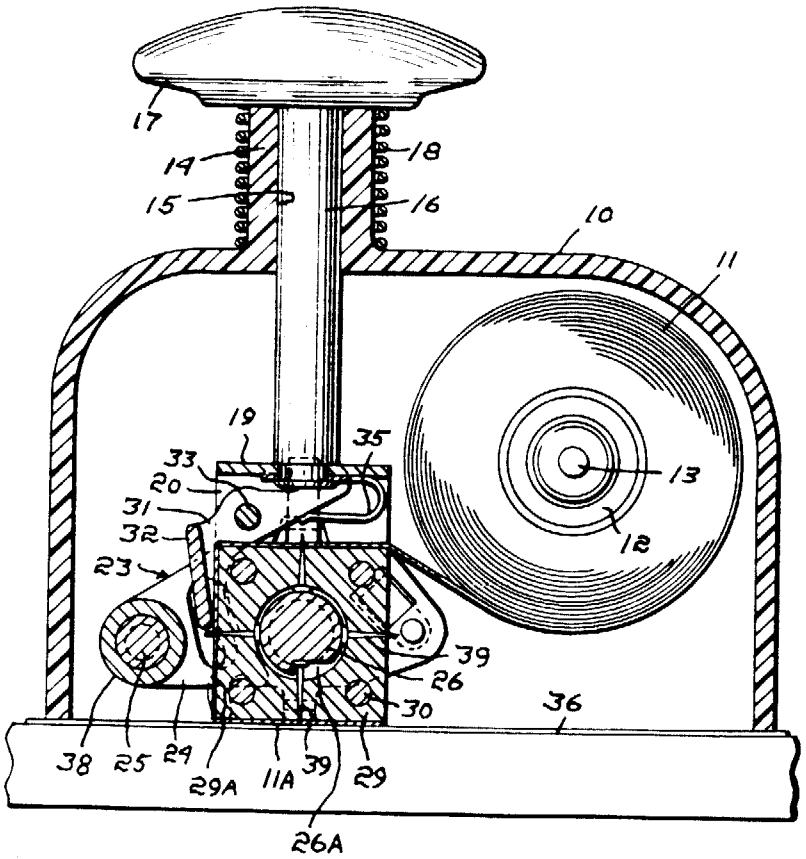
Figure 6:
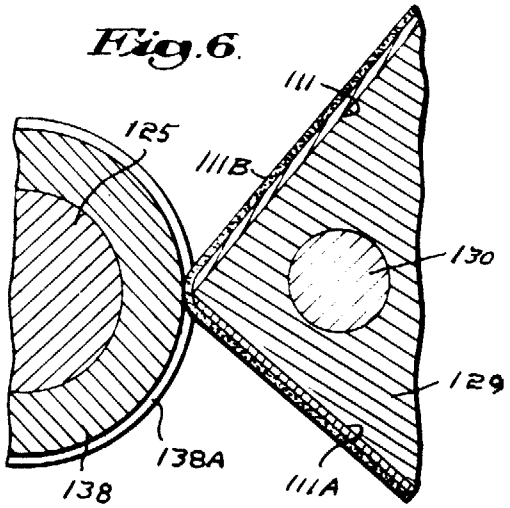
Figure 8:
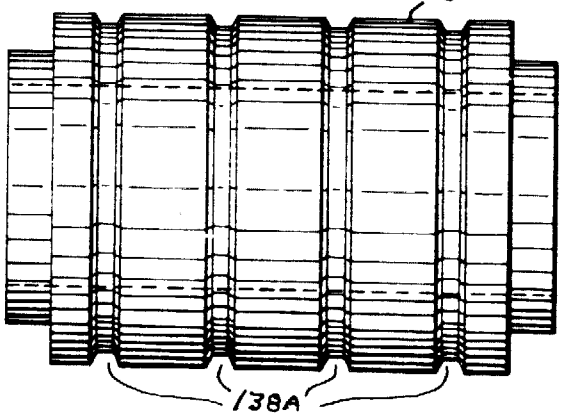
Figure 8:
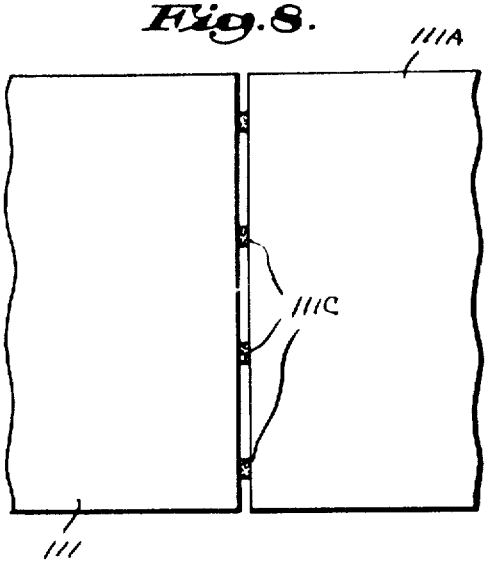
Figure 9:
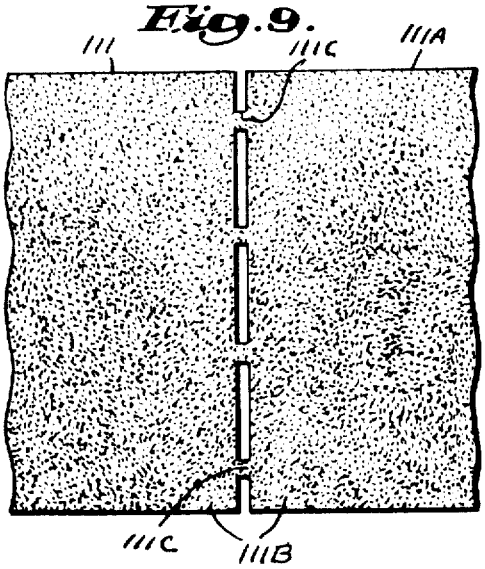
Figure 10:
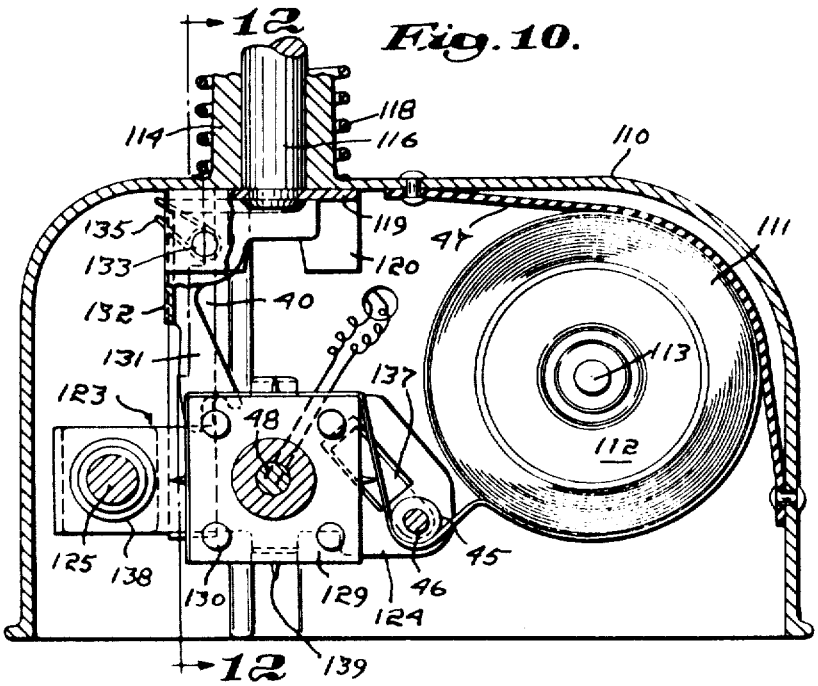
Figure 11:
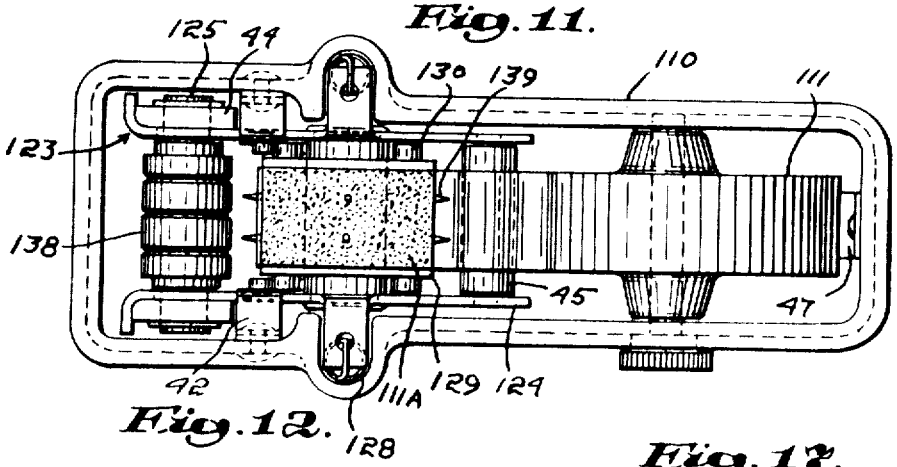
Figure 12:
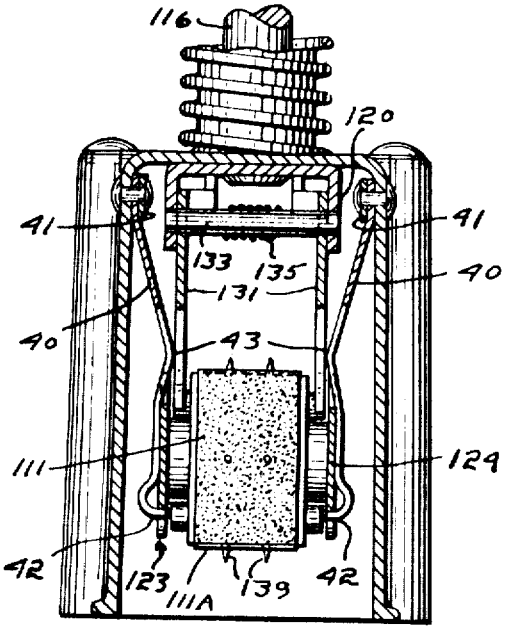
Figure 17:
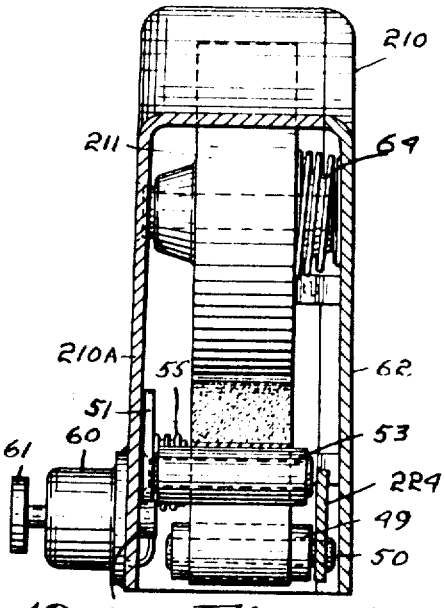
Figure 18:
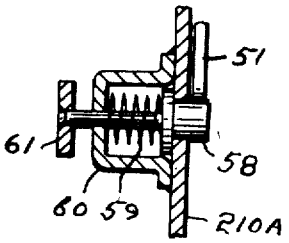
Figure 19:
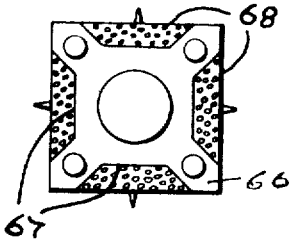
Figure 20:
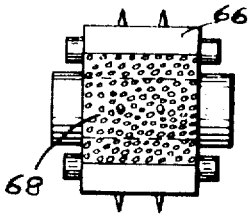
Figure 13:
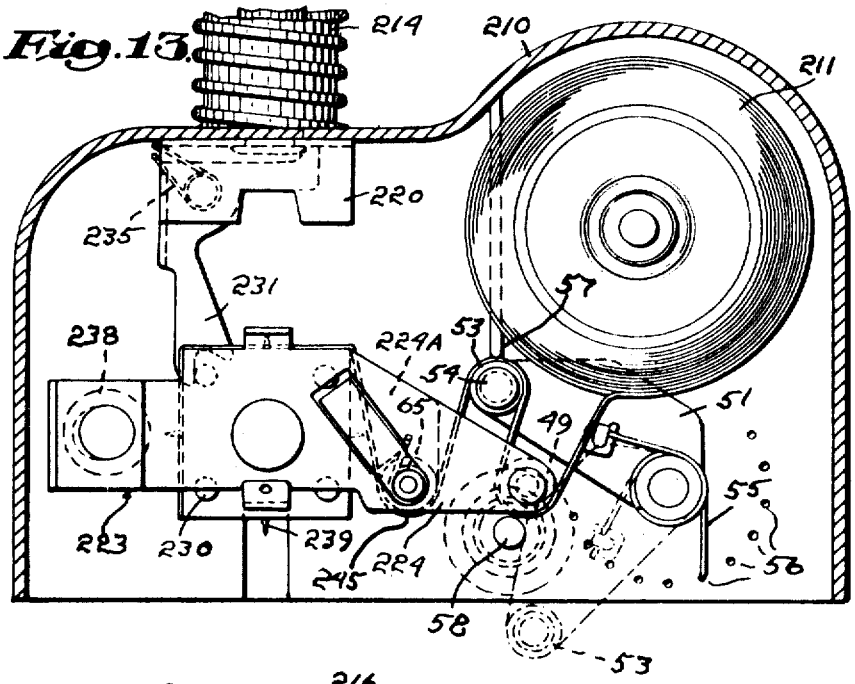
Figure 14:
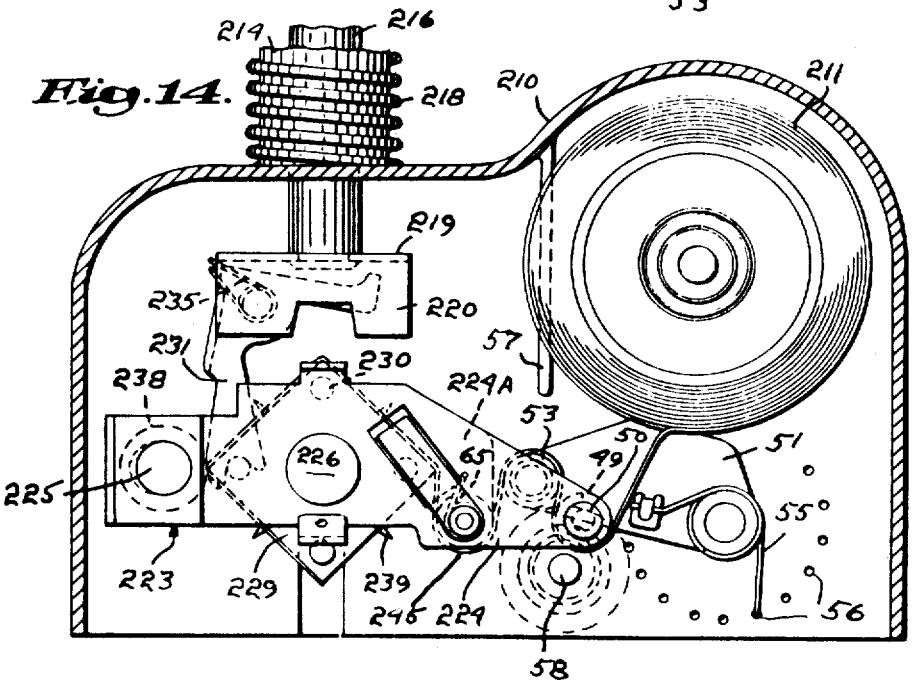
Figure 15:
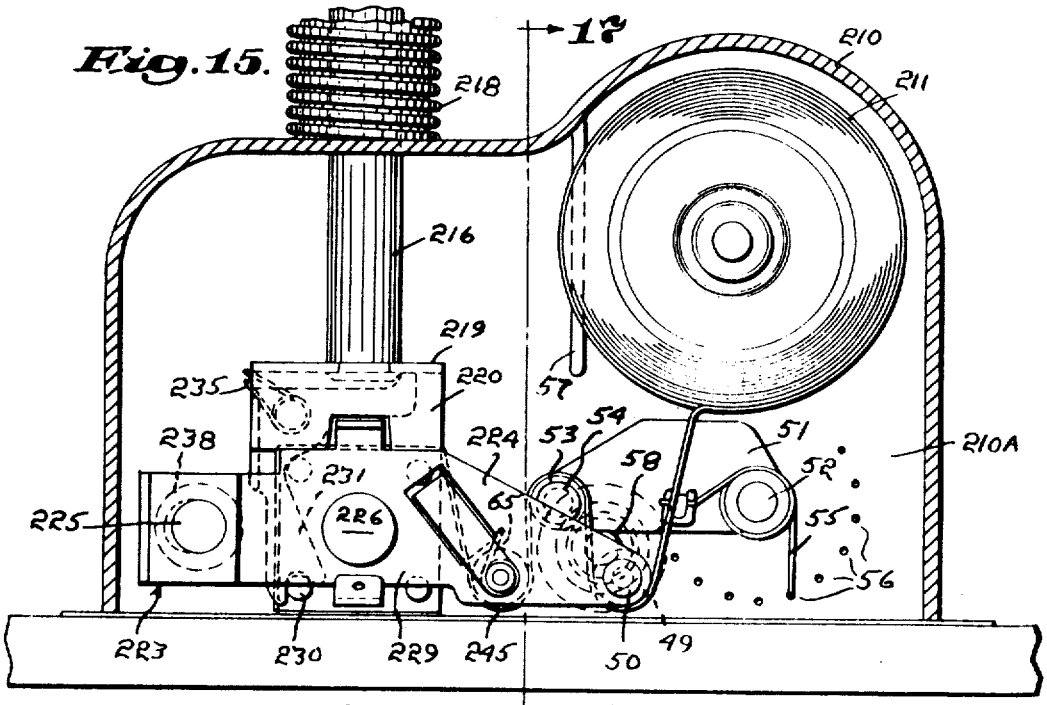
Figure 16:
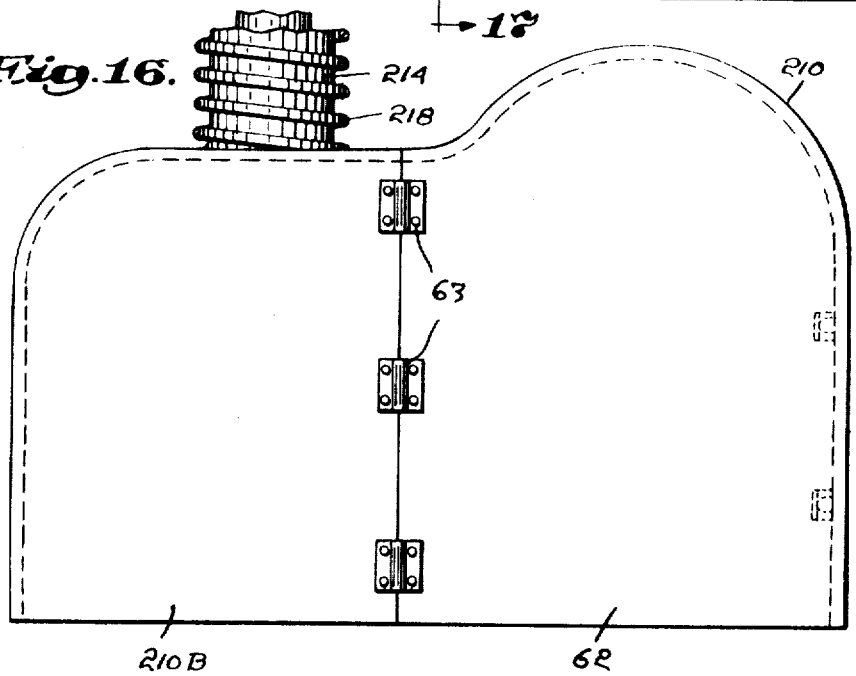

In the drawings:

FIG. 1 is a transverse vertical section of a tape dispensing and tape applying device in accordance with the invention, FIG. 2 is a longitudinal vertical section of the device taken approximately along the indicated lines 2—2 of FIG. 1, FIG. 3 is a bottom plan view of the device, FIG. 4 is a view similar to FIG. 2 but with the actuating mechanism partly depressed, FIG. 5 is a similar view but showing the actuator fully depressed, FIG. 6 is a vertical, fragmentary section on an increased scale, taken through the anvil and the feed member and illustrating their coaction in cutting tape, FIG. 7 is an elevation of the anvil on the scale of FIG. 6, FIG. 8 is a plan view, on the scale of FIGS. 5 and 6, illustrating the cut as seen from the back of the tape, FIG. 9 is a like view but showing the adhesive face of the tape, FIG. 10 is a view, generally similar to FIG. 2, illustrating another embodiment of the invention, FIG. 11 is a bottom plan view thereof, FIG. 12 is a section taken approximately along the indicated lines 12—12 of FIG. 10, FIG. 13 is a view similar to FIGS. 2 and 10 illustrating yet another embodiment of the invention, FIG. 14 is a like view with the actuating mechanism depressed to effect the turning of the tape-feed member, FIG. 15 is another like view with the actuating means depressed to move the tape-feed member into its tape-applying position, FIG. 16 is an elevation of the device as seen from the side having a door, FIG. 17 is a section taken approximately along the indicated lines 17—17 of FIG. 15, FIG. 18 is a section through the rectangular stop pin, FIG. 19 is an end view of a feed member in accordance with another embodiment of the invention, and FIG. 20 is a side elevation thereof.

The dispenser illustrated by FIGS. 1–5 of the drawings consists of a housing 10 in which a roll of pressure sensitive tape 11 on a hub 12 is located, the tape having its adhesive coated face inwardly disposed. The hub 12 is loosely mounted on a pivot 13 shown as extending freely through one side wall of the housing 10 and threaded into the other. The term "pressure-sensitive", as used herein, includes tapes of the pressure sensitive, heat sensitive, or pressure-heat sensitive types.

Forwardly of the tape roll 11, the housing 10 has an upwardly disposed boss 14 having a bore 15 slidably receiving an actuating stem 16 having a knob 17 fixed on its upper end. A coiled spring 18, held centered by the boss 14, is backed by the housing 10 and engages the undersurface of the knob 17 to yieldably urge the stem 16 upwardly. Fixed on the lower end of the stem 16 is a stop 19 limiting upward movement of the stem 16 and having transversely spaced, downwardly disposed side walls 20 which are centrally notched as at 20A.

Each side wall of the housing 10 has a vertical slot 21 transversely alined with the axis of the stem 16. A vertical bore 22 extends downwardly from the top of the housing 10 through each side wall and opens into the upper end of its slot 21.

A generally indicated frame 23 includes a pair of side members 24 interconnected by spacers 25 and 26 and these both serve as axles. The members 24 have upper and lower guides 24A and 24B, respectively, slidably entrant of the slots 21. Each lower guide 24B is connected to an anchor 27, one seated in the upper end of each bore 22, by a spring 28 thereby to yieldably maintain the frame 23 in its upper position in which the guides 24A are in engagement with the upper ends of the slots 21.

The spacer 26 rotatably supports a tape feed member 29 that is shown as square in cross section thus to provide flat, tape-carrying faces 29A, 29B, 29C, and 29D with the corners constituting linear cutting edges. Pins 30 extend transversely through both ends of the member 29, one adjacent each corner.

A pair of pawl members 31 interconnected at 32 are supported by a transverse pivot 33 carried by the side members 20. Each pawl member 31 is in the form of a bell crank with one end forked as at 34 for engagement with the pins 30. The other ends of the pawl members are yieldably held in engagement with the stop 19 by a U-shaped spring 35.

In FIG. 2, the feed member 29 is shown with the faces 29A and 29C parallel with the surface to which a tape section is to be applied, the surface being indicated at 36 in FIG. 4 with the face 29C being disposed towards the surface 36. The tape 11 extends across the surface 29A, downwardly along the face 29B and tightly around the intermediate corner. The pawl members 31 are shown as having their forked ends 34 in engagement with the ends of the pin 30 at that intermediate corner.

When the knob 17 is pushed downwardly, the member 29 is turned a quarter turn in a counter clockwise direction as the device is viewed in FIGS. 2, 4, and 5 with the corners traveling through an arc of 90° as will be apparent from a comparison of FIGS. 2 and 5 and with the face 29B replacing the face 29C as the face disposed towards the surface 36. The other faces of the feed member 29 are shifted accordingly, and another pin 30 is positioned with its ends engageable by the forked ends 34 when the knob 17 is released to permit the spring 18 to raise the stem 16 as far as permitted by the stop 19, see FIG. 2. The frame 23 carries a resiliently yieldably latch 37 to successively engage the pins 30 as the feed member is thus turned to hold it against turning in the other direction.

In practice, the pawls 31 are so dimensioned that the full stroke does not quite turn the feed member 29 a complete quarter turn and when such a complete quarter turn has been made, the latch 37 is not in contact with a pin 30. This arrangement permits the feed member 29 to rock on engagement with the surface 36.

The spacer 25 rotatably supports a cylindrical anvil 38 and this is so spaced relative to the spacer 26 that, on such turning of the feed member 29, it is engaged by the tape-coated corner between the faces 29A and 29B and, on such engagement, it exerts cutting pressure on the tape against the linear cutting edge provided by the engaged corner effectively to sever the tape thereby to provide a section 11A whose adhesive coated face is disposed parallel to and towards the surface 36.

It will be noted that as the knob 17 is pushed to a predetermined extent downwardly, the side walls 20 of the stop 19 engage the frame 23 and force it downwardly against the opposition of the springs 28 until the section 11A is pressed in place against the suface 36.

The feed member 29 has, as means releasably holding the tape to the feed member 29, headed pins 39 extending outwardly through each face with their heads riding on the spacer 26. The spacer 26 has a cam-shaped recess 26A in the zone of the face of the feed member 29 that is disposed towards the surface 36, the recess 26A being dimensioned to permit the pins 39 of that face to be forced inwardly upon contact of that face with the surface 36. The function of the pins 39 is to engage and puncture the tape to cause its positive movement with the feed member 29 as it turns. In addition, the pins 39 are operative to hold the severed section 11A in place until the section 11A is seated on the surface 36.

The embodiment of the invention illustrated by FIGS. 10–12 is generally similar to that just detailed. Its corresponding parts are designated by the prefix "1" added to the reference numerals identifying such parts and only the difference in construction will be described.

One such difference in construction is the use of hangers 40 for the frame 123 in the device illustrated by FIGS. 10–12. As may best be seen in FIG. 12, there are a pair of depending hangers 40, one for each side wall of the housing 100 and resiliently mounted therein as at 41. The lower ends of the hangers 40 have their ends turned towards each other to provide supporting shoulders 42 underlying the side members 124 of the generally indicated frame 123 and intermediate portions establishing angular projections 43 disposed towards each other in the path of the side walls 120 of the stem stop 119. As the stem 116 is depressed, the feed member 129 is turned with the tape 111 being cut by the coaction of the anvil 138 and the appropriate corner of the feed member. After completion of the tape-severing operation but before the full quarter turn of the feed member has been completed, the side walls 120 engage the projection 43 and wedge the hangers apart. The freed frame 123 is then moved into its section-applying position as the stem 116 is fully depressed. When the stem 116 is raised to an appropriate extent, the hangers 40 are free to move back to return their shoulders 42 to their frame-supporting position.

While the spring 135 has the same function as the spring 35, the spring 135 is shown as a coil spring supported by the pivot 133 with one of its ends bearing against the stop 129 and the other against the part 132 interconnecting the pawl members 131.

The anvil 138 differs from the anvil 38 in that the anvil 138, see FIGS. 6 and 7, has a series of annular, axially spaced peripheral grooves 138A and its spacer 125 is mounted in blocks 44 carried by the frame members 124, see FIG. 11. The blocks 44 are of resilient stock thereby to yieldably maintain the anvil in effective tape-cutting relationship with the corners of the feed members 129.

The function of the anvil grooves 138 may be most readily appreciated by reference to FIGS. 6, 8, and 9. The adhesive coat of the tape 111 is indicated at 111B. The grooves 138 are of such a depth that as a cut is made, see FIG. 6, the tape is cut through except where it is entrant of the grooves 138. As a consequence, the section 111A remains connected to the tape 111 by relatively weak links 111C which may be entirely adhesive and assist in the maintenance of the tape 111 in position on the feed member 129 but rupture readily when the feed member 129 is withdrawn from its section applying position relative to the surface to which the tape section 11A has been applied.

It will be appreciated that for effectively tape cutting and the effective application of the sections, the tape must so lay against the uppermost face of the feed member 129 as to be pierced by the pins 139 of that face. This result is not positively attained by the embodiment of the invention illustrated by FIGS. 1–5 so that another structural difference in the embodiment of FIGS. 10–12 is the addition of a fairing roll 45 rotatably mounted on a spacer 46 carried by the frame members 124 between the feed member 129 and the tape roll 111 adjacent but out of the path of the adjacent corner of the downwardly disposed face of the feed member 129. With the tape trained about the fairing roller 45, the tape 111 is caught by the pins 139 on the proximate vertical face of the feed member 129 as it turns as will be apparent from FIG. 10.

It is desirable to ensure against the tape roll 111 turning too freely when the device is actuated. Such control may be variously effected, as by a rubber strap 49 so anchored to the housing as to yieldably engage the periphery of the roll 111 thereby not only to provide a drag but also to provide a bias on the roll in a winding direction.

As some tapes are heat sensitive or pressure-heat sensitive, the provision of tape-heating means for the feed member 129 is desirable and is shown as effected by a heating element 48 located in an axial bore in the spacer 126 and conveniently of the cartridge type.

The embodiment of the invention illustrated by FIGS. 13–17 is generally similar to the embodiments that have been previously described and its construction, other than additional features and important structural changes, will not be detailed and corresponding parts are distinguishable by the addition of the prefix "2" to the reference numerals identifying such corresponding parts.

Tape that is relatively fragile cannot withstand the pull exerted when the tape feed member is rotated without the likelihood that it will be ripped lengthwise by the anchoring pins of the tape feed member and it is to the avoidance of this objectionable possibility that this embodiment of the invention is particularly directed.

In this embodiment of the invention, the generally indicated frame 223 has side members 224 and 224A, the side member 224 extending beyond the side member 224A and having a roller 49 mounted on an axle 50 disposed parallel to but spaced from the axis of the roller 245.

An arm 51, pivoted as at 50 to the rear wall 210A of the housing 210, carries a roller 53 mounted on an axle 54 and disposed towards the side member 224 and having an arcuate path that passes between the roller 245 and the roller 49 as the arm 51 is swung downwardly from its normal, upper position, illustrated by full lines in FIG. 13, through its normal range and into its inoperative position indicated in dotted lines in FIG. 13. A spring 55 anchored to the arm 51 and in a selected one of a series of holes 56 in the housing wall 210A is operative to urge the arm 51 upwardly with its upper position shown as determined by the stop 57 and its normal lower position established by a retractable stop pin 58.

As may be seen in FIG. 18, the stop pin 58 extends through the housing wall 210A and is urged into its operative position by a spring 59 in a mount 60 attached to the wall 210A. The pin 58 is provided with a button 61 enabling the pin 58 to be manually withdrawn from its operative position to enable the arm 50 to be swung into and held thereby in its operative position.

The housing 210 has a door 62 connected by a hinge 63 to the front housing wall 210B to enable a roll of tape 211 to be rotatably mounted therein. The door 62 is shown as having a coil spring 64 secured thereto to engage the tape roll 211 when the door 62 is closed both to provide a drag against its turning too readily and a limited bias in a winding direction, thus to take up slack.

With a roll of tape 211 in the housing 210 the arm 51 is swung downwards into and held in its inoperative position and the tape is entered between the rollers 53 and the rollers 245 and 49, pulled across the rollers 245 and 48, and its adhesive coated face pressed against the lowermost face of the feed member 229. The stop pin 58 is then withdrawn to permit the arm 51 to move into its normal range in response to the spring 55. When the feed member 229 is then turned through a step, the attached end of the tape becomes a double layer so that thereafter the adhesive coated face of the tape is outwardly disposed with respect to the feed member 229, as is the case with the attachment of the tape to the tape feed members of the other embodiments of the invenion.

In the embodiment illustrated by FIGS. 13–17, the roller 245 is held against rotation, except in a tape-unwinding direction, by a one-way clutch 65, shown for convenience simply as a coiled spring 65 encircling the reduced roller end within the frame 223, the reduced end being defined one of the journalled ends 245A. One spring end is anchored to the frame wall 224 so that the spring 65 tightens up to hold the roller 245 against turning in one direction and loosens to permit the roller 245 to turn freely in the other direction.

When the device is operated to deliver a tape section 211A, the turning of the feed member 229 through a quarter turn exerts a "yank" on the tape which is cushioned by the yieldably supported roller 49 and yields towards the stop pin 56 to enable the length of tape looped over it to be pulled without such resistance as would risk the tearing of the tape by the tape-anchoring pins 239.

When the frame 223 is moved downwardly to establish the tape-applying position of the feed member 229, the one-way clutch 65 prevents any pull on the tape attached o the feed member 229 and the roller 49 cannot be pulled downwardly once its arm 51 has engaged the stop pin 58. As a consequence, downward movement of the frame 223 results in tape being pulled directly from its roll and this length of tape is taken up in a loop over the roller 53, when returned into its elevated position by its spring 55, the unwound length being at least equal to the length of a face of the feed member 229.

Tapes that are not fragile are not as readily pierced by the anchoring pins 239 as fragile tapes and if looped over the roller 53, there would not be sufficient resistance to ensure proper tape feeding. For that reason, if the tape is not of a fragile type, it is passed across the rollers 49 and 245 with the roller 53 still in its normal range and hence not used so that the device functions in the same manner as the embodiment illustrated by FIGS. 10–12.

As illustrative of special tape application, reference is made to the use of tape for mounting an article, such as a pencil, on a surface such as a display card. For such purposes, special feed members are required and reference is made to FIGS. 19 and 20 where a feed member 66 is shown as having a transverse channel 67 in each face. Each channel 67 is dimensioned to accommodate the article when the face in which it is formed presses the tape section against the surface and it may be filled with an insert such as the sponge rubber insert 68.

From the foregoing, it will be apparent that the invention meets the practical problems involved in the use and application of sections of tapes of pressure sensitive, heat sensitive, or pressure-heat sensitive types. Important to this result, is the advancing and cutting of the tape without the tape becoming adhesively attached to the device. The means releasably connecting the tape to the tape feed members is also an important feature as is the fact that while the tape section is being applied to a surface, the tape feed member is free to rock to a limited extent, as may be required by the nature of that surface.

I claim:

1. In a device for applying to a surface a section of tape of a pressure sensitive, heat sensitive, or pressure-heat sensitive type, a rotatable feed member that has a plurality of angularly disposed faces and is axially supported, said member having a section-applying position in which a face is disposed proximate to said surface, each corner of said member being a linear, transverse cutting edge, means operable to so turn said feed member as to bring the next adjacent face into said position, said feed member including means operable to detachably anchor said tape to each face on engagement of the tape therewith and releasable on engagement with said surface, and means coacting with the trailing corner of a tape-covered face to cut the tape to provide a section.

2. The device of claim 1 in which the feed member is a regular geometric figure.

3. The device of claim 2 in which the geometric figure is a square.

4. The device of claim 1 in which each face has a transverse channel.

5. The device of claim 4 in which there is a resiliently yieldable filler in each channel.

6. The device of claim 1 in which the tape is of the heat sensitive or pressure-heat sensitive type and the device includes means to apply heat to the tape.

7. The device of claim 6 in which the heating means is axially of and within the feed member.

8. The device of claim 1 in which the feed turning means is of the pawl and pin type.

9. The device of claim 1 in which the coacting means is an anvil in the path of the corners, successively, of the feed member as it turns.

10. The device of claim 9 in which the anvil is a rotatable cylinder.

11. The device of claim 9 in which the device includes supporting structure for the anvil, the supporting structure including resiliently yieldable supports for the anvil.

12. The device of claim 10 in which the anvil has at least one annular groove.

13. The device of claim 12 in which the groove depth is so proportioned to the thickness of the tape that the corner and the means coacting therewith are operative to so sever the tape as to provide an easily rupturable connection but adequate to maintain the tape in contact with the feed member on the outfeed side of the coacting means.

14. The device of claim 1 in which the feed member turning means includes a stem and a pawl member pivotably connected, the feed member includes a series of pins exposed at least at an end thereof, one pin for each face, the pawl member being in engagement with one pin whereby the feed member is turned in one direction to the desired extent when the stem is actuated, the next trailing pin then being positioned for engagement by the pawl member when the stem is retracted, and resilient latch means successively engaging the pins as the feed member turns thereby to hold the feed member against turning in the other direction.

15. The device of claim 14 in which the engagement of the resilient latch means and the pawl member with the feed member permits rocking movement of the feed member.

16. The device of claim 1 in which the strip-anchoring means includes an axle in support of the feed member, and headed pins slidably supported by the feed member, at least one pin protruding through each face of the feed member with its head riding on the periphery of the axle so that the pin punctures the strip to provide positive feed thereof and holds the section until it has been applied to the surface, and the axle has a recessed cam surface in the zone of the section-applying position and dimensioned to enable the pin of the face in that position to be forced inwardly on contact wtih the surface and then to be again forced outwardly when the feed member is again turned.

17. The device of claim 16 in which there are two headed pins for each feed member face.

18. The device of claim 1 in which there is a fairing roller disposed on the infeed side of the feed member.

19. The device of claim [1] *31* and tape-supporting and guiding means at the infeed side of the feed member including an outfeed roller free to turn only in a tape feeding direction and a resiliently yieldable tape support yieldable from a normal position when the member is turned to cushion the pull thereof.

20. The device of claim 1 and a frame by which the feed member and the anvil are rotatably supported and which is connected to the device for movement towards and away from the surface, and the turning means is also operable to move the frame into a surface-engaging position.

21. The device of claim 20 and hanger means holding the frame and releasable by the turning means after the turning means has partially turned the feed member.

22. The device of claim 20 in which the turning means includes a stem having a stop member and a connection operable to turn the feed member, the stop member engaging the frame after the feed member has turned and moving it into a surface engaging position while permitting rocking movement thereof.

23. The device of claim 22 and a pair of hangers normally supporting the frame but including portions disposed in the path of the stop member so as to be wedged apart thereby into a frame-releasing position after the feed member has been partially turned.

24. The device of claim 20 in which a fairing roller is rotatably connected to the frame on the infeed side of the feed member.

25. In a device for applying to a surface a section of tape from a roll thereof, the tape being of a pressure-sensitive, heat sensitive, or pressure-heat sensitive type, a support for a tape roll, brake means operable as a drag on the turning of the tape roll when mounted on said support, a rotatable feed member including a plurality of angularly disposed faces and axially supported, said member having a section-applying position in which a face is disposed proximate to said surface, each corner of said member being a linear, transverse cutting edge, means operable to so turn said feed member as to bring the next adjacent face into said position said feed member including means operable to detachably anchor said tape to each face on engagement of the tape therewith and releasable on engagement with said surface, and means coacting with the trailing corner of a tape-covered face to cut the tape to provide a section.

26. The device of claim 25 in which the brake means is operative to yieldably urge the roll in a slack taking up direction.

27. In a device for applying to a surface a section of tape from a roll thereof, the tape being of a pressure sensitive, heat sensitive, or pressure-heat sensitive type, a support for the tape roll, a frame movable towards and away from an operative position, a feed member including a plurality of angularly disposed faces and axially and rotatably supported by said frame, said member having a section-applying position in which a face is disposed proximate to said surface, each corner of said member being a linear transverse cutting edge, means operable to so turn said feed member as to bring the next adjacent face into said position and then move said frame into said operative position, said feed member including means operable to detachably anchor said tape to each face on engagement of the tape therewith and releasable on engagement with said surface, and means coacting with the trailing corner of a tape-covered face to cut the tape to provide a section.

28. The device of claim 27 in which there are first and second rollers carried by the frame at the infeed side of the feed member engageable by the adhesive coated face of the tape, the first roller being adjacent the feed member and rotatable only in a tape-feeding direction, a cushioning roller is connected to the device for movement along a vertical path between said pair of rollers and engageable by the other face of the tape, and a spring yieldably maintains the roller at the upper end of the path in an elevated position from which it is pulled downwardly as the feed member is turned, means at the lower end of said path preventing movement of the cushioning roller during movement of the frame into its operative position thereby to exert an unwinding pull on the tape and form a loop, and during upward movement of the frame to its normal position, the spring raises the cushioning roller to maintain the loop, the length of the path and the arrangement and spacing of the rollers being such that the loop provides a tape length at least equal to a face of the feed member.

29. The device of claim 28 in which an arm is pivotably attached to the device with its axis parallel to that of the feed member to swing between elevated and loading positions, the cushioning roller is attached to the arm, the loading position below the plane of the first and second rollers, and a releasable means normally prevents movement of the arm into the loading position.

30. The device of claim 29 in which the releasable means is operative to hold the arm from movement out of the loading position.

*31. In a device for applying to a surface a section of tape of a pressure sensitive, heat sensitive, or pressure-heat sensitive type, means to rotatably support a roll of said tape, a rotatable feed member that has a plurality of angularly disposed faces and is axially supported and about which tape is trained, said member having a section-applying position in which a face is disposed proximate to said surface, each corner of said member being a linear, transverse cutting edge, means operable to so turn said feed member as to bring the next adjacent face into said position, a tape-guiding roller at the infeed side of said feed member and free to turn only in a tape-feeding direction, slack take-up means yieldably biasing the tape in the opposite direction and means coacting with the trailing corner of a tape-covered face to cut the tape to provide a section.*

*32. The device of claim 31 in which the slack take-up means yieldably urges the rotation of the tape roll in a direction.*

*33. The device of claim 31 and means to move the feed member from a first position in which it is turned into a surface-engaging position and at the same time pull a face-engaging length of tape from the roll, and resiliently yieldable take-up means operative as the feed member returns into its first position to take up and store for the next cycle tape thus pulled from the roll.*

References Cited

The following references, cited by the Examiner, are of record in the patented file of this patent or the original patent.

UNITED STATES PATENTS

| | | | |
|---|---|---|---|
| 993,732 | 5/1911 | Storck | 156—530 |
| 2,441,821 | 5/1948 | Kendall | 156—530 |
| 3,220,909 | 11/1965 | Kaplan et al. | 156—530 |
| 3,576,695 | 4/1971 | Stine | 156—521 |
| 3,649,413 | 3/1972 | Way | 156—518 |

DOUGLAS J. DRUMMOND, Primary Examiner

U.S. Cl. X.R.

156—577